(12) United States Patent
Keeney et al.

(10) Patent No.: US 6,422,571 B1
(45) Date of Patent: Jul. 23, 2002

(54) AUTOMOTIVE VEHICLE SEAL AND DECORATIVE TRIM STRIP

(75) Inventors: John D. Keeney, Fremont; Charles C. Mayfield, Jr., Portsmouth, both of NH (US)

(73) Assignee: Hutchinson Sealing Systems, Inc., Farmington Hills, MI (US)

( * ) Notice: Subject to any disclaimer, the term of this patent is extended or adjusted under 35 U.S.C. 154(b) by 0 days.

(21) Appl. No.: 09/557,847

(22) Filed: Apr. 26, 2000

(51) Int. Cl.[7] .................................................. F16J 15/14
(52) U.S. Cl. ........................ 277/590; 277/628; 277/906; 277/921
(58) Field of Search ................................. 277/590, 628, 277/650, 906, 921, 944, 651, 652; 49/377, 374, 495

(56) References Cited

U.S. PATENT DOCUMENTS

| | | | |
|---|---|---|---|
| 4,934,101 A | | 6/1990 | Hannya et al. |
| 4,956,941 A | | 9/1990 | Vaughan |
| 5,042,201 A | * | 8/1991 | Vaughn ....................... 49/482 |
| 5,083,832 A | | 1/1992 | Ohya |
| 5,564,249 A | | 10/1996 | Borys et al. |
| 5,636,895 A | * | 6/1997 | Ito et al. .................... 49/479.1 |
| 5,970,659 A | * | 10/1999 | Oord ............................ 49/377 |
| 6,082,048 A | * | 7/2000 | Backes et al. ................ 49/377 |
| 6,138,338 A | * | 10/2000 | Berry ........................... 29/415 |

* cited by examiner

Primary Examiner—Anthony Knight
Assistant Examiner—Enoch Peavey
(74) Attorney, Agent, or Firm—Dykema Gossett PLLC

(57) ABSTRACT

A weather strip seal for an automotive vehicle is provided including a generally rigid carrier reinforcement for retaining the shape of the weather stripping; a first ionomer material extruded onto or carried by the carrier, the ionomer material having a glossy surface; and a second elastomeric material extruded onto the carrier, the second material being provided for sealing between a first structure the weather stripping is attached to and a second structure.

17 Claims, 2 Drawing Sheets

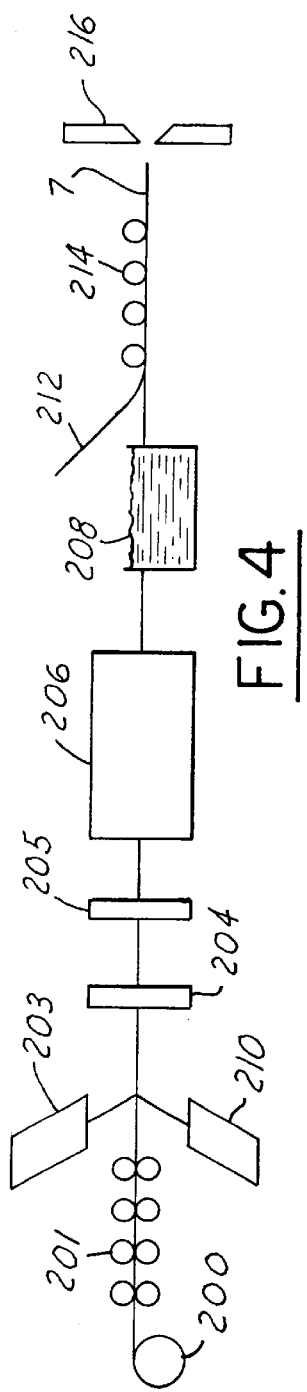
FIG. 4
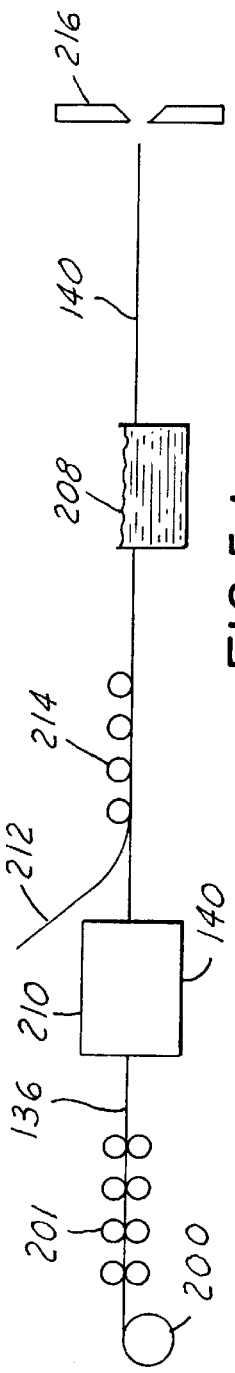
FIG. 5A
FIG. 5B
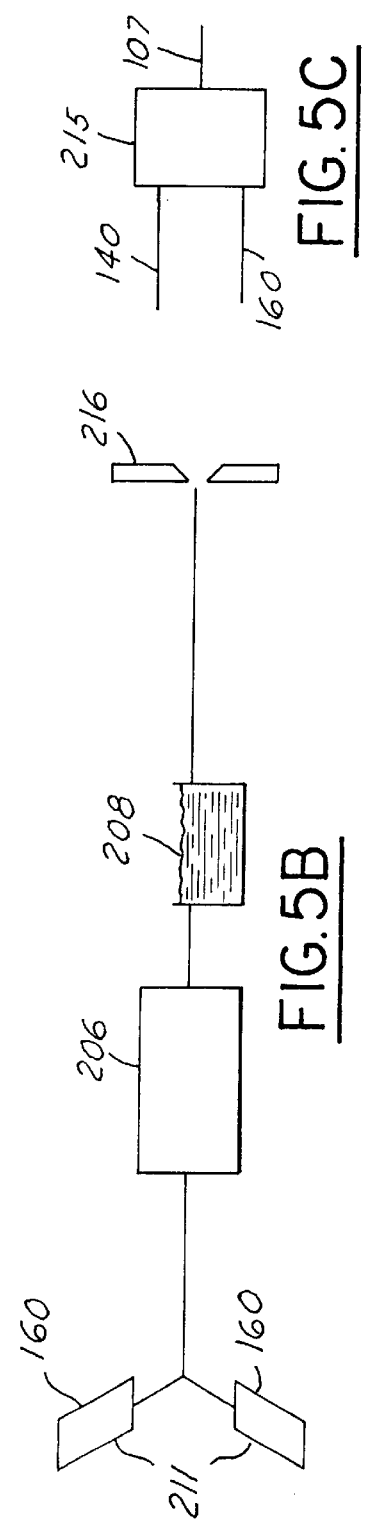
FIG. 5C

AUTOMOTIVE VEHICLE SEAL AND DECORATIVE TRIM STRIP

FIELD OF THE INVENTION

The field of the present invention is that of weather strip seals and decorative trim for automotive vehicles. More particularly, the field of the present invention is that of a sealing strip extrusion that combines the functions of a sealing strip and a decorative trim.

BACKGROUND OF THE INVENTION

Automotive vehicles have an exterior sheet metal, plastic or fiberglass body with a plurality of body panels. Virtually all automotive vehicles have movable and/or fixed windows in their side doors. Accordingly, there is a requirement for various designs of weather stripping to seal gaps between one body panel structure and another body panel structure or a body panel structure in a movable or fixed window.

The sealing requirements for a weather strip typically bring about a usage of materials such as EPDM, TPV or TPR rubber or a thermoplastic material. These materials would typically have a durometer somewhere between 40 and 90 shore A to allow the material to properly seal.

Many automotive vehicles also have decorative trim which is pigmented to blend, match, or contrast with the color of the automotive vehicle body panels. This decorative trim is often utilized to conceal the sealing strip since most sealing strips are black due to the high amounts of carbon black used for mixing the sealing material. Typically, the decorative trim needs a glossy finish which can withstand the harsh environmental conditions which exist on the exterior of an automotive vehicle during extreme weather conditions or during high speed travel of the vehicle. Accordingly, most automotive trim strips are made of materials with a higher durometer, that being a harder material.

It is desirable to provide an automotive vehicle trim strip which can function as both a sealing strip and decorative trim.

It is also desirable to provide an automotive vehicle trim strip as mentioned above which can additionally be extruded.

SUMMARY OF THE INVENTION

To make manifest the above delineated desires, the revelation of the present invention is brought forth.

In a preferred embodiment, the weather strip of the present invention provides a generally rigid carrier reinforcement which retains the shape of the weather stripping. Although a plurality of materials can be utilized, a metal such as stainless steel is typically found to be preferable. Extruded onto the stainless steel carrier is an ionomer. The ionomer has a black or color surface finish in various degrees of gloss. Co-extruded or carried upon the carrier is an EPDM rubber portion. The EPDM rubber provides a substance with excellent sealing requirements. If appropriate, the EPDM rubber can also have flocking added to reduce friction against moving closure members such as windows.

The weather stripping of the present invention is particularly useful in applications of an outer belt seal and decorative strip along the vehicle door for the movable window which is encased within the door envelope.

The present invention also finds special application in sealing the door frame against the vehicle door opening.

Other features and desires of the present invention can be discovered by a review of the accompanying drawings and detailed description of the preferred embodiments.

BRIEF DESCRIPTION OF THE DRAWINGS

FIG. 4 is a schematic view of the extrusion process utilized in producing a weather strip according to the present invention.

FIG. 5 is a schematic view of a process utilized in producing the weather strip of the present invention in a modified embodiment.

DETAILED DESCRIPTION OF THE DRAWINGS

Figure 1:
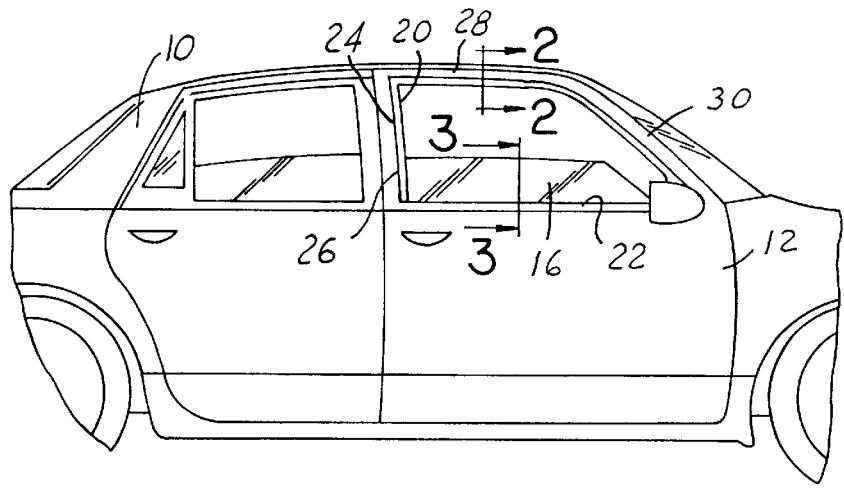
FIG. 1 is a side elevational view of an automotive vehicle having a side door with an extendable window wherein the window opening has an enclosing frame.
Figure 3:
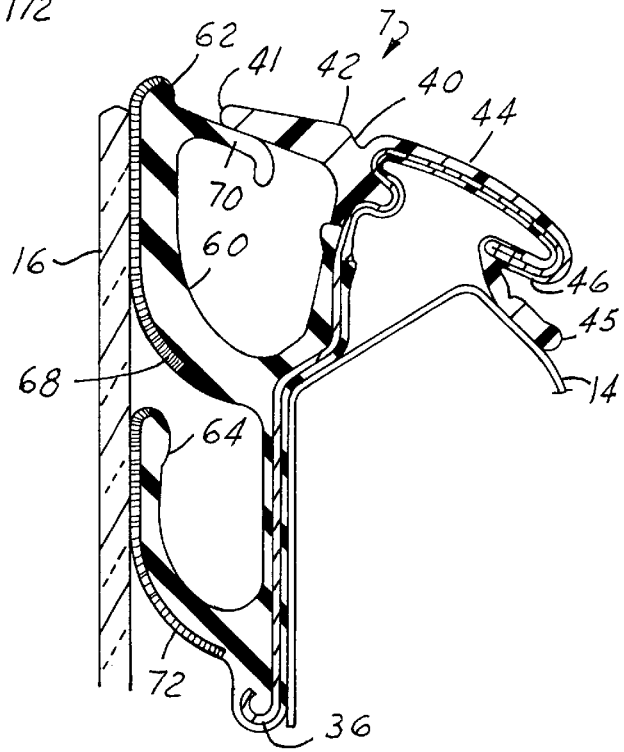
FIG. 3 is a sectional view taken along line 3—3 of FIG. 1.

Referring to FIG. 1, an automotive vehicle 10 has a front door 12. Referring additionally to FIG. 3, the front door 12 has outer sheet metal 14 which forms half of a door envelope. Mounted for extension into and out of the door envelope is a window pane 16. The window pane 16 in its upright position closes a door opening 20. The door opening 20 has a belt portion 22. Extending up from the belt border 22 is a door frame 24 having a B pillar portion 26, a header portion 28, and an A pillar portion 30.

Adjacent the belt portion 22 is a belt seal 7 (FIG. 3) according to the present invention. The belt seal 7 has a generally rigid carrier 36. The carrier 36 may be formed from a plurality of materials. However, the best material typically is a 434 stainless steel having a 0.5 mm thickness. The carrier may also be cold rolled steel, aluminum or galvanized cold rolled steel or other suitable materials. Extruded onto the carrier is a first material which is an ionomer 40 produced by DuPont Company. At least the top surface in portions 42 and 44 of the ionomer will have a polyester film applied thereto to film form the surface. As shown in FIGS. 1 and 3, the polyester film forming enhances the glossy finish of the ionomer bringing its finish to at least an 80 degree finish. The ionomer is available in 20 to 90 degree gloss. The ionomer is typically a harder material which can retain its shape in harsh environmental conditions. Typically, the ionomer will have a 30 shore A to 57 shore D durometer. The ionomer may be pigmented to match, contrast or blend with the remainder of the vehicle body.

Co-extruded with the ionomer material 40 is an elastomeric or thermoplastic material 60. As shown, the material is EPDM rubber. However, other suitable alternatives such as TPV or TPR may be utilized. The second material 60 is extruded to form an upper sealing wing 62 and a lower sealing wing 64. The upper sealing wing 62 has flocking 68 applied thereto to lower sliding resistance with the window pane 16. Additionally, the upper sealing wing 62 has a lip 70 which laterally contacts an extension 41 of the ionomer. The lower sealing wing 64 also has a low friction coating or flocking 72 applied therewith for making sliding sealing engagement with the window glass 16. In a manner similar to the ionomer material, the EPDM rubber material 60 is extruded on both sides of the carrier 36. In an alternate embodiment (not shown), the EPDM rubber is extruded on one side only of the carrier. Typically the carrier 36 will be attached to the sheet metal of door 14 by fastener or other appropriate means (not shown). From the exterior of the vehicle, virtually all of the EPDM material 60 will be concealed from view by the ionomer material 40. The ionomer material 40 also has the greatest exposure to the outer environment. Typically the placement of a weather strip seal 7 upon the sheet metal of the door 14 will be such that a wing 45 of the ionomer will be in close engagement with the sheet metal of the door 14.

Figure 2:
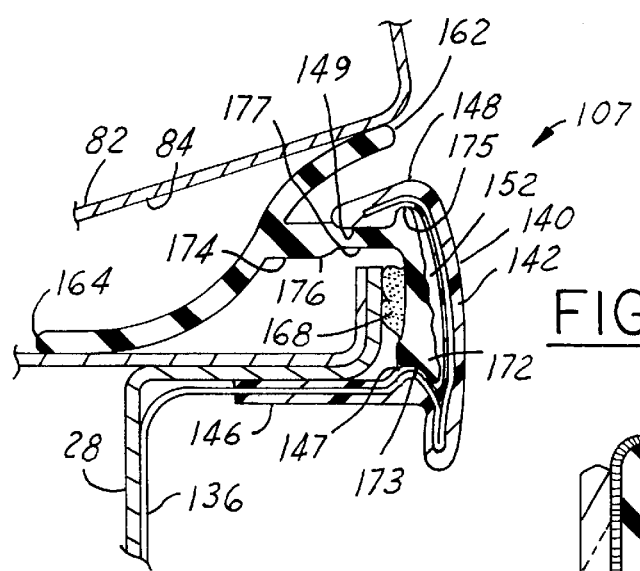
FIG. 2 is a sectional view taken along line 2—2 of FIG. 1.

In FIG. 2, a seal strip 107 seals an upper end of the header door frame 28 against the sheet metal 82 of the vehicle front door opening 84. The seal 107 has a carrier 136. The carrier 136 is also fabricated from a stainless steel material. The carrier 136 has extruded thereon a first ionomer material 140. The carrier is fixably connected to the header door frame by screws (not shown). The material 140 has applied to its outer surface 142 a polyester film to enhance its glossy surface. The polyester film is applied to the ionomer before it is cooled, and removed prior to installation on the vehicle. The ionomer material 140 is extruded on both sides of the carrier 136. Since portion 146 of the ionomer is essentially hidden from view, it is not required that it be covered with a polyester film to enhance its glossiness. The EPDM extrusion rubber seal portion 160 has a sponge region 168 and an upper sealing wing 162 which engages the sheet metal 82 of the door opening and a lower sealing wing 164 that engages the header portion of the door frame 28. Again, the ionomer portion 140 virtually totally conceals the sheet metal of the header portion and the EPDM rubber seal portion 160. Gaps 150 and 152 allow for processing tolerances in size for the extruded portions 140 and 160, which portions are friction fitted together. No adhesive is utilized.

One of many advantages of the seal 107 is that the ionomer portion 140 can be made to appear as an outer door sheet metal of the header frame. Referring to the rubber seal portion 160 in more detail, the rubber seal portion has a leg 172. Leg 172 is captured in slight compression and/or frictional engagement having a bottom portion 173 in contact with the ionomer portion 140 along a bottom hump 147. The top portion of the leg 172 has a head region 175 which is captured within a hook portion 148 of the ionomer portion 140. The extrusion 160 also has a web 176 with an enlarged thickness portion 174 and a reduced thickness portion 177. The reduced thickness portion 177 of the web 176 has engagement with the bottom flat 149 of the hook 148 of the ionomer portion 140.

Referring to FIG. 4, a coil 200 of the stainless steel carrier material 36 is provided. The coil is run through a series of forming rollers 201 to form its desired shape. The carrier is then brought through an extrusion die which is fed by an EPDM extruder 203 and an ionomer extruder 210. The extrusion is then passed through an adhesive applicator 204 and a flocker 205. The extrusion is then passed through a curing oven 206. After passage through curing oven 206, the extrusion is run through a cooling bath 208, the polyester film is added to the ionomer to enhance its glossy appearance. The film is removed before the extrusion is installed on the vehicle.

Referring to FIG. 5 with common items given similar reference numerals, the carrier 136 pulled off a coil 200 and passed through forming rollers 201. Carrier 136 then passes through an extruder 210 to add the ionomer material 140. The ionomer extrusion 140 is then brought underneath rollers 214 to add the polyester film 212 to enhance its appearance, then through cooling bath 208, and cut off at station 216. In a separate operation, an extruder is fed EPDM material 160. The extruder 211 will not only form the body and the wings of the EPDM material, but will also form the sponge portion 168. The sealing wings and sponge portion 168 are brought through a curing oven 206. The material is then passed through a cooling bath 208. The extrusions 140, 160 are cut to length and joined at a joining station 215.

While the invention has been described in connection with specific embodiments thereof, it is evident that many alternatives, modifications, and variations will be apparent to those skilled in the art in light of the foregoing description. Accordingly, it is intended to embrace all such alternatives, modifications and variations that fall within the spirit and broad scope of the appended claims.

We claim:

1. A weather strip seal for an automotive vehicle comprising:

a generally rigid carrier reinforcement for retaining the shape of said weather stripping;

a first ionomer material extruded onto said carrier, said ionomer having a glossy surface with a first end secured on both sides of said carrier and a second end secured on both sides of said carrier, said first ionomer material having an extension; and a second elastomeric material, extruded onto said carrier, said second material being provided for sealing between a first structure said weather stripping is attached to and a second structure, said second material at an extreme end having a lip laterally contacting said first ionomer material extension; and said second elastomeric material being virtually concealed from view by said first ionomer material extension.

2. A weather strip seal for an automotive vehicle as described in claim 1, wherein said second material is an EPDM rubber.

3. A weather strip seal for an automotive vehicle as described in claim 1, wherein said elastomeric material is extruded directly onto said carrier.

4. A weather strip seal for an automotive vehicle as described in claim 1, wherein said elastomeric material is extruded onto said first material.

5. A weather strip seal for an automotive vehicle as described in claim 1, having a glossy surface on said first material which has been film formed by a film being applied thereto and later being removed to provide a glossy surface on said first material.

6. A weather strip seal for an automotive vehicle as described in claim 1, wherein said glossy surface is between 20 and 90 degrees.

7. A weather strip seal for an automotive vehicle as described in claim 1, wherein said second material also has a low friction coating.

8. A weather strip seal for an automotive vehicle as described in claim 1, wherein said second material additionally has flocking attached thereto.

9. A weather strip seal for an automotive vehicle as described in claim 1, wherein said second material seals a second structure which has relative movement with respect to the first structure.

10. A weather strip seal for an automotive vehicle as described in claim 1, wherein said first material is oriented towards a vehicle exterior.

11. A weather strip seal for an automotive vehicle as described in claim 1, wherein said carrier is a metal.

12. A weather strip seal for an automotive vehicle as described in claim 11, wherein said carrier is fabricated from one of a group of materials including stainless steel, cold rolled steel, aluminum or galvanized cold rolled steel.

13. A weather strip seal for an automotive vehicle comprising:

a generally rigid metal carrier reinforcement for retaining the shape of said weather stripping;

a first ionomer material extruded onto said carrier, said ionomer having a glossy surface provided by a polyester film applied thereto and later removed;

said first ionomer material being extruded on both sides of said carrier and having a major surface for facing outwards toward an exterior of said automotive vehicle, and said first ionomer material having an extension; and a second EPDM rubber material, extruded onto said carrier, said second material having a higher durometer than said first ionomer material, said EPDM material being provided for sealing between a first structure said weather stripping is attached to and a second structure, and said second elastomeric material at an extreme end having a lip laterally contacting said first ionomer material extension and said second elastomeric material being virtually concealed from view by said first ionomer material.

14. A weather strip seal for an automotive vehicle comprising:

a generally rigid carrier reinforcement for retaining the shape of said weather stripping;

a first ionomer material extruded onto said carrier, said ionomer having a glossy surface and a hook; and a second extruded elastomeric material, carried by said carrier, said second material being provided for sealing between a first structure said weather stripping is attached to and a second structure, wherein said second elastomeric material has a leg with a bottom end contacting a mound, said leg having a head captured by said hook of said first ionomer material, and said second elastomeric material has a web joined to said leg with engagement with said first ionomer material hook, and said second elastomeric material has two sealing wings extending from said web, and wherein one of said sealing wings engages said first structure and another of said sealing wings engages said second structure.

15. A weather strip seal for an automotive vehicle as described in claim 14, wherein said web has an enlarged thickness portion and a reduced thickness portion engaging said hook.

16. A weather strip seal for an automotive vehicle as described in claim 14, wherein said second material additionally has a sponge portion.

17. A weather strip seal for an automotive vehicle as described in claim 14, wherein said sponge portion engages with said first structure to seal an area between said first structure and said first ionomer material.

* * * * *